US012790128B2

(12) United States Patent
Zhang

(10) Patent No.: US 12,790,128 B2
(45) Date of Patent: Nov. 10, 2026

(54) METHOD, SYSTEM AND APPARATUS FOR IMPURITY INSPECTION, DEVICE, STORAGE MEDIUM, AND SOFTWARE PRODUCT

(71) Applicant: Hangzhou AliCloud Feitian Information Technology Co., Ltd., Hangzhou City (CN)

(72) Inventor: Xuejun Zhang, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/685,205

(22) PCT Filed: Jan. 19, 2023

(86) PCT No.: PCT/CN2023/073056
§ 371 (c)(1),
(2) Date: Feb. 20, 2024

(87) PCT Pub. No.: WO2023/138641
PCT Pub. Date: Jul. 27, 2023

(65) Prior Publication Data
US 2025/0136382 A1 May 1, 2025

(30) Foreign Application Priority Data
Jan. 19, 2022 (CN) ........................ 202210061333.X

(51) Int. Cl.
*B65G 33/14* (2006.01)
*B65G 15/30* (2006.01)
(Continued)

(52) U.S. Cl.
CPC ............ *B65G 33/14* (2013.01); *B65G 15/30* (2013.01); *G06T 7/0004* (2013.01); *G06T 7/33* (2017.01);
(Continued)

(58) Field of Classification Search
None
See application file for complete search history.

(56) References Cited

U.S. PATENT DOCUMENTS

| | | | | |
|---|---|---|---|---|
| 10,776,963 | B2 * | 9/2020 | Schieke | G06T 12/30 |
| 2001/0033372 | A1 * | 10/2001 | Dragotta | G01N 21/51 356/239.5 |

(Continued)

FOREIGN PATENT DOCUMENTS

| | | | | |
|---|---|---|---|---|
| CN | 101303316 | A | | 11/2008 |
| CN | 102024143 | A | * | 4/2011 |

(Continued)

OTHER PUBLICATIONS

Machine Translation JP 2006111416 A (Year: 2006).*
(Continued)

*Primary Examiner* — Michelle M Entezari Hausmann
(74) *Attorney, Agent, or Firm* — Osha Bergman Watanabe & Burton LLP

(57) ABSTRACT

Embodiments of the present application provide a method, a system and an apparatus for impurity inspection in a product, a device, a storage medium, and a software product. The method includes: determining a product object to be inspected and placing the product object in an inspection state, performing video capture on the product object in the inspection state from a plurality of different preset capture angles to obtain captured videos of the product object at each of the preset capture angles, performing image processing on the captured video to obtain captured images corresponding
(Continued)

to each of the preset capture angles, and performing impurity inspection on the product object according to the captured images corresponding to each of the preset capture angles to generate a corresponding inspection result.

17 Claims, 4 Drawing Sheets

(51) Int. Cl.
*G06T 7/00* (2017.01)
*G06T 7/33* (2017.01)

(52) U.S. Cl.
CPC ............... *G06T 2207/10016* (2013.01); *G06T 2207/20224* (2013.01); *G06T 2207/30108* (2013.01)

(56) References Cited

U.S. PATENT DOCUMENTS

| | | | | |
|---|---|---|---|---|
| 2010/0082280 | A1* | 4/2010 | Schneider | A61B 5/06 702/94 |
| 2017/0243399 | A1* | 8/2017 | Troy | B64F 5/40 |
| 2017/0343483 | A1* | 11/2017 | Piana | B65G 17/26 |
| 2018/0052120 | A1 | 2/2018 | Murakami | |
| 2020/0354164 | A1* | 11/2020 | Fujio | B65G 41/002 |
| 2021/0262945 | A1* | 8/2021 | Schlezinger | G01N 21/8851 |
| 2022/0147752 | A1* | 5/2022 | Liao | G06T 3/4038 |
| 2022/0230394 | A1* | 7/2022 | Milne | G01B 11/245 |
| 2026/0153925 | A1* | 6/2026 | Liu | G06F 3/013 |

FOREIGN PATENT DOCUMENTS

| | | | | | |
|---|---|---|---|---|---|
| CN | 104315977 | A | | 1/2015 | |
| CN | 109632809 | A | | 4/2019 | |
| CN | 110895247 | A | | 3/2020 | |
| CN | 104597058 | A | | 6/2020 | |
| CN | 112991281 | A | | 6/2021 | |
| CN | 113469126 | A | | 10/2021 | |
| CN | 113516621 | A | | 10/2021 | |
| CN | 113887354 | A | | 1/2022 | |
| CN | 114092476 | A | | 2/2022 | |
| CN | 111355931 | A | | 6/2022 | |
| JP | H0868618 | A | | 3/1996 | |
| JP | 2006111416 | A | * | 4/2006 | B65G 47/244 |

OTHER PUBLICATIONS

CN-102024143-A machine translation (Year: 2011).*
China National Intellectual Property Administration; International Search Report and Written Opinion issued in PCT App. No. PCT/CN2023/073056 dated Apr. 19, 2023; 15 pages.
China National Intellectual Property Administration; Office Action issued in CN App No. 202210061333.X dated Jan. 19, 2022.
China National Intellectual Property Administration; Notice of Allowance issued in 202210061333.X dated Apr. 1, 2022; 7 pages.
Z. Duan, Z. Yan and p. Yang, "An adaptive threshold segmentation algorithm for impurity in liquid automatic detecting system," 2009 IEEE International Conference on Intelligent Computing and Intelligent Systems, Shanghai, China, 2009, pp. 170-174, doi: 10.1109/ICICISYS.2009.5357698.
Cai, Jin Hui et al.; "The Design of Stereoscopic Vision System for Detection of Impurities"; Journal of Optoelectronics—Laser; vol. 16, No. 12; Dec. 2005; 5 pages.

* cited by examiner

METHOD, SYSTEM AND APPARATUS FOR IMPURITY INSPECTION, DEVICE, STORAGE MEDIUM, AND SOFTWARE PRODUCT

CROSS-REFERENCE TO RELATED APPLICATIONS

This application is a National Stage of International Application No. PCT/CN2023/073056, and filed on Jan. 19, 2023, which claims priority to Chinese Patent Application No. 202210061333.X, filed with the China National Intellectual Property Administration on Jan. 19, 2022 and entitled "METHOD, SYSTEM AND APPARATUS FOR IMPURITY INSPECTION, DEVICE, STORAGE MEDIUM, AND SOFTWARE PRODUCT". The disclosures of the aforementioned applications are hereby incorporated by reference in their entireties.

TECHNICAL FIELD

The present application relates to a field of computer technology and, in particular, to a method for impurity inspection in a product, a system for impurity inspection in a product, an apparatus for impurity inspection in a product, an electronic device, a computer readable storage medium and a software product.

BACKGROUND

During a production of bottled liquid (liquor, beverage, medicine, etc.), due to factors such as quality of raw materials (wine bottles) and processing technology (filling), there may be various types of defects in a product that affect quality of the product. A commonly used liquid impurity inspection method is an artificial light inspection method, for the artificial light inspection method, it has disadvantages of high labor intensity, low efficiency, strong subjectivity in the inspection results, easy fatigue of inspection personnel, large fluctuation in missed inspection rate, and susceptibility to physiological factors of the inspection personnel, which may no longer meet production requirements of automatic production lines.

SUMMARY

Embodiments of the present application provide a method, a system and an apparatus for impurity inspection in a product, an electronic device, a computer readable storage medium, and a software product, to solve or partially solve problems of low inspection efficiency, poor inspection results, and poor inspection stability in a process of inspecting a liquid product.

An embodiment of the present application discloses a method for impurity inspection in a product, including:

determining a product object to be inspected and placing the product object in an inspection state;

performing video capture on the product object in the inspection state from a plurality of different preset capture angles to obtain captured videos of the product object at each of the preset capture angles;

performing image processing on the captured video to obtain a captured image corresponding to the preset capture angle; and performing impurity inspection on the product object according to the captured images corresponding to each of the preset capture angles to generate an inspection result corresponding to the product object.

In an implementation, the placing the product object in the inspection state includes:

placing the product object in an inspection state of a target tilt angle as well as vibration and/or rotation.

In an implementation, the performing the image processing on the captured video to obtain the captured image corresponding to the preset capture angle includes: extracting a target number of image frames from the captured video corresponding to the preset capture angle; and performing image alignment on the image frames corresponding to each of the preset capture angles to obtain the captured images corresponding to each of the preset capture angles.

In an implementation, the performing the image alignment on the image frames corresponding to each of the preset capture angles to obtain the captured images corresponding to each of the preset capture angles includes:

extracting product feature information corresponding to the product object in each of the image frames; and performing image correction on the image frames according to the product feature information corresponding to each of the image frames to obtain the captured images corresponding to each of the preset capture angles.

In an implementation, the performing the impurity inspection on the product object according to the captured images corresponding to each of the preset capture angles to generate the inspection result corresponding to the product object includes:

combining the captured images corresponding to the preset capture angles to obtain a number of original image groups, and constructing a differential matrix corresponding to the original image group;

performing image processing by using the differential matrix to generate a target image group corresponding to the original image group; and performing impurity inspection on the product object by using each of the target image groups to generate the inspection result corresponding to the product object.

In an implementation, the constructing the differential matrix corresponding to the original image group includes:

performing a pixel value subtraction between two adjacent captured images in the original image group to obtain a number of differential images corresponding to the original image group; and constructing the differential matrix corresponding to the original image group by taking each of the captured images as a matrix element in a first column and taking the differential images as matrix elements in other columns.

In an implementation, the performing the image processing by using the differential matrix to generate the target image group corresponding to the original image group includes:

performing differential processing on other differential images in the same row, except for the captured image in the first column of the differential matrix, to obtain a first differential item and a second differential item corresponding to each row of the differential matrix;

performing feature stitching by taking the captured image in the same row of the differential matrix as a R channel of an image, taking the first differential item as a G channel, and taking the second differential item as a B channel, to generate an inspection image corresponding to the captured image of each row in the differential matrix; and combining each of the inspection images into the target image group corresponding to the original image group.

In an implementation, the performing the impurity inspection on the product object by using each of the target image groups to generate the inspection result corresponding to the product object includes:

performing impurity inspection by inputting each of the target image groups into an impurity inspection model to obtain inspection information corresponding to the target image group;

if each piece of the inspection information characterizes that the product object does not contain an impurity, generating product conformity information for the product object; and if at least one piece of inspection information characterizes that the product object contains an impurity, obtaining impurity category information and impurity probability information corresponding to the impurity, and adopting the impurity category information and the impurity probability information to generate product re-inspection information corresponding to the product object.

An embodiment of the present application also discloses a system for impurity inspection in a product, including: an infeed apparatus, a conveyor apparatus, a number of collection apparatuses corresponding to different preset capture angles, and an apparatus for impurity inspection; where, the infeed apparatus is configured to convey a product object to be inspected and place the product object in an inspection state;

the collection apparatus are configured to perform video capture on the product object in the inspection state during a process of conveying the product object by the conveyor apparatus, to obtain captured videos of the product object at each of the preset capture angles; and the apparatus for impurity inspection is configured to perform image processing on the captured video to obtain a captured image corresponding to the preset capture angle, and perform impurity inspection on the product object according to the captured images corresponding to each of the preset capture angles to generate an inspection result corresponding to the product object.

In an implementation, the infeed apparatus includes at least a front conveyor belt, a corner clamp belt, and a lamp inspection clamp belt;

the corner clamp is configured to place the product object to be inspected conveyed by the front conveyor belt at a target tilt angle;

the lamp inspection clamp belt is configured to perform vibration and/or rotation processing on the product object; and the front conveyor belt is configured to convey the product object in a state of a target tilt angle, and vibration and/or rotation to the conveyor apparatus.

In an implementation, the conveyor infeed apparatus includes at least an infeed turnplate, a conveyor turnplate, and a outfeed turnplate, and the conveyor turnplate includes multiple product stations;

the infeed turnplate is configured to convey the product object conveyed by the front conveyor belt to the product station;

the product station is configured to place the product object in a self-rotating state; and the outfeed turnplate is configured to convey the inspected product object out of the conveyor turnplate.

In an implementation, the collection apparatus includes a number of image collection devices set according to a preset angle difference;

the image collection device is configured to perform video capture on the product object in the inspection state according to the preset capture angle during a process of conveying the product object, to obtain a captured image corresponding to the preset capture angle.

In an implementation, the apparatus for impurity inspection includes at least a captured image extraction module, an image inspection module; where, the captured image extraction module is configured to extract a target number of image frames from the captured video corresponding to the preset capture angle, extract product feature information corresponding to the product object in each of the image frames, and perform correction on the image frames according to the product feature information corresponding to each of the image frames to obtain the captured images corresponding to each of the preset capture angles; and the image inspection module is configured to combine the captured images corresponding to two adjacent preset capture angles to obtain a number of original image groups, and construct a differential matrix corresponding to the original image group, then perform image processing by using the differential matrix to generate a target image group corresponding to the original image group, and perform impurity inspection on the product object by using each of the target image groups to generate the inspection result corresponding to the product object.

In an implementation, the image inspection module includes a differential matrix module, an image group module, and an inspection module; where, the differential matrix module is configured to perform a pixel value subtraction between two adjacent captured images in the original image group to obtain a number of differential images corresponding to the original image group, and construct the differential matrix corresponding to the original image group by taking each of the captured images as a matrix element in a first column and taking the differential images as matrix elements in other columns;

the image group module is configured to perform differential processing on other differential images in the same row, except for the captured image in the first column of the differential matrix, to obtain a first differential item and a second differential item corresponding to each row of the differential matrix, perform feature stitching by taking the captured image in the same row of the differential matrix as a R channel of an image, take the first differential item as a G channel, and take the second differential item as a B channel, to generate an inspection image corresponding to the captured image of each row in the differential matrix, and combine each of the inspection images into the target image group corresponding to the original image group; and the inspection module is configured to perform impurity inspection by inputting each of the target image groups into an impurity inspection model to obtain inspection information corresponding to the target image group, if each piece of the inspection information characterizes that the product object does not contain an impurity, generate product conformity information for the product object; and if at least one piece of inspection information characterizes that the product object contains an impurity, obtain impurity category information and impurity probability information corresponding to the impurity, and adopt the impurity category information and the impurity probability information to generate product re-inspection information corresponding to the product object.

An embodiment of the present application also discloses an apparatus for impurity inspection in a product, including:

an inspection state processing module, configured to determine a product object to be inspected and placing the product object in an inspection state;

a captured video obtaining module, configured to perform video capture on the product object in the inspection state from a plurality of different preset capture angles to obtain captured videos of the product object at each of the preset capture angles;

a captured image determining module, configured to perform image processing on the captured video to obtain a captured image corresponding to the preset capture angle; and an inspection result generating module, configured to perform impurity inspection on the product object according to the captured images corresponding to each of the preset capture angles to generate an inspection result corresponding to the product object.

In an implementation, the inspection state processing module is specifically configured to:

place the product object in an inspection state of a target tilt angle as well as vibration and/or rotation.

In an implementation, the captured image determining module includes:

an image frame extraction submodule, configured to extract a target number of image frames from the captured video corresponding to the preset capture angle; and a captured image obtaining submodule, configured to perform image alignment on the image frames corresponding to each of the preset capture angles to obtain the captured images corresponding to each of the preset capture angles.

In an implementation, the captured image obtaining submodule is specifically configured to:

extract product feature information corresponding to the product object in each of the image frames; and perform image correction on the image frames according to the product feature information corresponding to each of the image frames to obtain the captured images corresponding to each of the preset capture angles.

In an implementation, the inspection result generating module includes:

a differential matrix constructing submodule, configured to combine the captured images corresponding to the preset capture angles to obtain a number of original image groups, and constructing a differential matrix corresponding to the original image group;

an image group generating submodule, configured to perform image processing by using the differential matrix to generate a target image group corresponding to the original image group; and an inspection result generating submodule, configured to perform impurity inspection on the product object by using each of the target image groups to generate the inspection result corresponding to the product object.

In an implementation, the differential matrix constructing submodule is specifically configured to:

perform a pixel value subtraction between two adjacent captured images in the original image group to obtain a number of differential images corresponding to the original image group; and construct the differential matrix corresponding to the original image group by taking each of the captured images as a matrix element in a first column and taking the differential images as matrix elements in other columns.

In an implementation, the image group generating submodule is specifically configured to:

perform differential processing on other differential images in the same row, except for the captured image in the first column of the differential matrix, to obtain a first differential item and a second differential item corresponding to each row of the differential matrix;

perform feature stitching by taking the captured image in the same row of the differential matrix as a R channel of an image, take the first differential item as a G channel, and take the second differential item as a B channel, to generate an inspection image corresponding to the captured image of each row in the differential matrix: and combine each of the inspection images into the target image group corresponding to the original image group.

In an implementation, the inspection result generating submodule is specifically configured to:

perform impurity inspection by inputting each of the target image groups into an impurity inspection model to obtain inspection information corresponding to the target image group;

if each piece of the inspection information characterizes that the product object does not contain an impurity, generate product conformity information for the product object; and if at least one piece of inspection information characterizes that the product object contains an impurity, obtain impurity category information and impurity probability information corresponding to the impurity, and adopt the impurity category information and the impurity probability information to generate product re-inspection information corresponding to the product object.

An embodiment of the present application also discloses an electronic device, including: a processor, a communication interface, a memory, and a communication bus, where the processor, the communication interface, and the memory communicate with each other through the communication bus;

the memory is configured to store a computer program; and the processor is configured to implement the method as described in any one of the embodiments of the present application when executing the program stored in the memory.

An embodiment of the present application also discloses a computer readable storage medium storing instructions which, when executed by one or more processors, enable the processor to execute the method as described in any one of the embodiments of the present application.

An embodiment of the present application also discloses a software product including a computer program/instructions, where when the computer program/the instructions are executed, the method as described in any one of the embodiments of the present application is implemented.

The embodiments of the present application include the following advantages.

Embodiments of the present application can be applied to automated inspection of the product object, by determining a product object to be inspected and placing the product object in an inspection state, performing video capture on the product object in the inspection state from a plurality of different preset capture angles to obtain captured videos of the product object at each of the preset capture angles, performing image processing on the captured video to obtain captured images corresponding to each of the preset capture angles, and performing impurity inspection on the product object according to the captured images corresponding to each of the preset capture angles to generate a corresponding inspection result, thus, in the impurity inspection process, by performing impurity inspection through placing the product object in an inspection state, it may reduce the irrelevant variable factors in the inspection process of the product object, and ensure the stability of the inspection results; and by performing image collection on the product object from a plurality of different preset capture angles, it may effectively enhance the image features, improve the precision of the product inspection, and ensure the accuracy of the inspection results; moreover, based on the automation of the product inspection, the inspection efficiency may be effectively improved.

DESCRIPTION OF EMBODIMENTS

Figure 1:
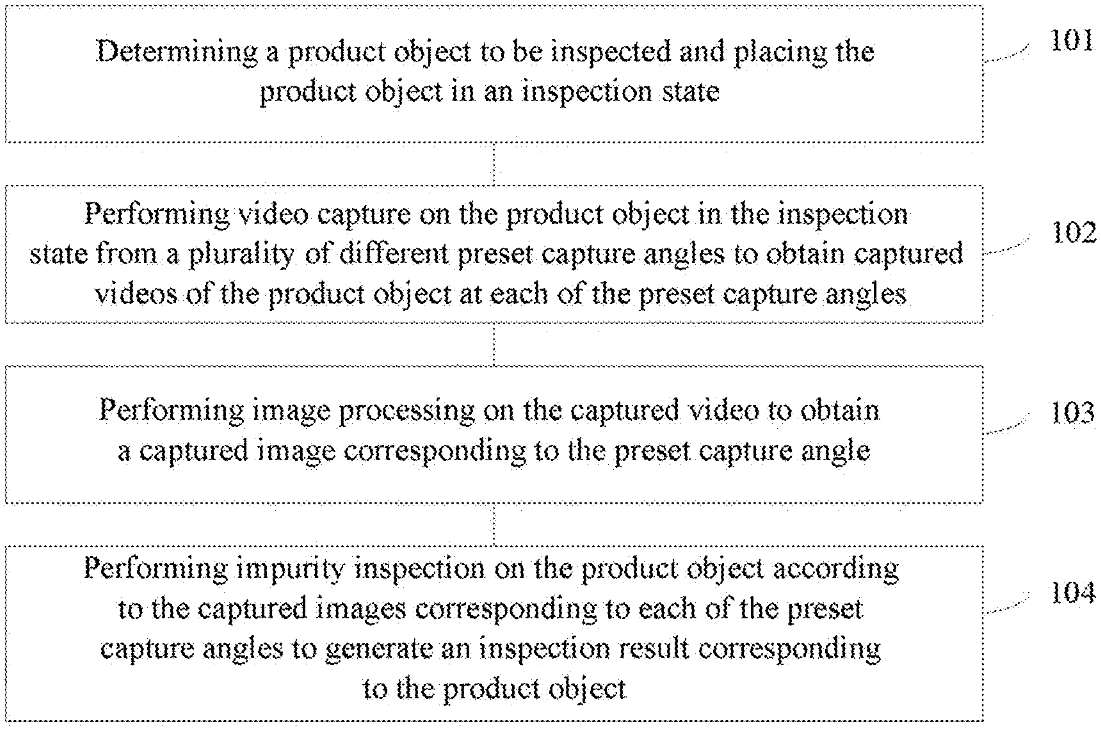
FIG. 1 is a step flowchart of a method for impurity inspection in a product provided in an embodiment of the present application.

In order to make the above objects, features and advantages of the present application more obvious and understandable, the present application is described in further detail below in conjunction with the accompanying drawings and specific implementations.

For AIoT (Artificial Intelligence & Internet of Things), it can be a combination of artificial intelligence technology and Internet of Things technology, through the Internet of Things, a massive amount of data from different dimensions is generated and collected, stored in the cloud and edge, and then through big data analysis and higher forms of artificial intelligence, everything is data-driven and intelligently connected. The integration of the Internet of Things technology and the artificial intelligence ultimately aims to form an intelligent ecosystem, within which different intelligent terminal devices, different system platforms, and different application scenarios may be integrated and interconnected, and everything can be integrated. For AIoT, it can be applied in the field of industry, such as automated production, automated inspection, etc., through AIoT, the work efficiency of industrial production, industrial inspection, etc. can be effectively improved, at the same time, through automated processing, it can effectively reduce labor costs, ensure product quality, and the accuracy of inspecting results.

As an example, during the process of producing the transparent bottled liquid, due to factors such as the quality of the raw materials and the processing technology, there may be various types of defects in the product that affect the quality of the product. In a production line, there are generally a number of quality inspection links that may be configured to inspect different types of defects, however, due to the variety of defects, some defects are small and not easy to inspect, resulting in manufacturers often needing to invest in a significant amount of labor costs in product quality inspection. In the process, on the one hand, the quality inspection effect of the quality inspection personnel is susceptible to personal energy, mood and other subjective emotions, which cannot guarantee the stability and accuracy of the quality inspection effect. And in order to cultivate the professional quality inspection abilities of the quality inspection personnel, it is easy to further increase the manpower cost of the manufacturer. On the other hand, for the manual quality inspection, the quality inspection is inefficient, which cannot meet the actual production needs.

In this regard, one of the core invention points of embodiments of the present application lies in the application of automated inspection of the product object, by determining a product object to be inspected and placing the product object in an inspection state, performing video capture on the product object in the inspection state from a plurality of different preset capture angles to obtain captured videos of the product object at each of the preset capture angles, performing image processing on the captured video to obtain captured images corresponding to each of the preset capture angles, and performing impurity inspection on the product object according to the captured images corresponding to each of the preset capture angles to generate a corresponding inspection result, thus, in the impurity inspection process, by performing impurity inspection through placing the product object in an inspection state, it may reduce the irrelevant variable factors in the inspection process of the product object, and ensure the stability of the inspection results; and by performing image collection on the product object from a plurality of different preset capture angles, it may effectively enhance the image features, improve the precision of the product inspection, and ensure the accuracy of the inspection results; moreover, based on the automation of the product inspection, the inspection efficiency may be effectively improved.

Specifically, referring to FIG. 1, FIG. 1 shows a step flowchart of a method for impurity inspection in a product provided in an embodiment of the present application, which may specifically include the following steps.

Step 101, determining a product object to be inspected and placing the product object in an inspection state.

In an embodiment of the present application, the impurity inspection of the product may be applied to a system for impurity inspection, where the system for impurity inspection may be a system used in a production line to perform impurity inspection on the product object, and it may include an infeed apparatus, a conveyor apparatus, a collection apparatus, an apparatus for impurity inspection, a removing apparatus, and the like. Where the conveyor apparatus may be configured to convey the product object to be inspected, the infeed apparatus may be configured to, during the conveying processing, place the product object in an inspection state, the conveyor apparatus may convey the product object in the inspection state, the collection apparatus may perform image collection on the product object in the inspection state, the apparatus for impurity inspection perform impurity inspection on the captured images, and then the removing apparatus may classify the product object based on the inspection result, achieving automated inspection of product objects.

In an example, the infeed apparatus may include a pushing material clamp belt, a corner clamp belt, a lamp inspection clamp belt, a rotation apparatus, a distributing material screw apparatus, an infeed turnplate, etc.; the conveyor apparatus may include a front conveyor belt, an infeed turnplate, a conveyor turnplate, and an outfeed turnplate, etc.; the collection apparatus may include a number of image collection devices corresponding to different capture viewpoints; and the removing apparatus may include a removing receiving-material conveyor belt, a removing component, etc. In the actual inspection process, the product object may be sent into the lamp inspection clamp belt through the pushing material clamp belt and the corner clamp belt in accordance with the specified angle, and adding vibration, so as to achieve placing the product object in the inspection state; and then, the product object in the inspection state enters the product station of the conveyor turnplate at an equal interval for revolution through the rotation apparatus, the distributing material screw apparatus, the infeed turnplate, etc. Where each product station is equipped with a motor that can achieve rotation while the product object revolves, at this time, foreign objects within the product object are suspended by rotation and revolution, which is easy to perform image collection. Image collection devices are installed at specific product stations on the conveyor turnplate, e.g. 0°, 90°, 180° and 270°, to perform image collection on the product object. When the product object has been inspected, it can be sent out from the conveyor turnplate by passing through the outfeed turnplate, and the unqualified product object may be removed through the removing component at the exit, so as to realize the removing of the defective product, thereby realizing the automated inspection process of the product object.

For the product object, it may be a product that needs to be inspected in automated production, e.g., transparent bottled liquid, transparent canned liquid, and cupped transparent liquid. It is to be noted that, in the embodiments of the present application, the impurity inspection of bottled transparent liquid is exemplarily illustrated as an example, and it is to be understood that the present application does not limit this.

In practice, the production line may convey the product object to be inspected to the inspection apparatus through the corresponding conveyor apparatus, so that the inspection apparatus may perform a quality inspection on the product object to be inspected, and classify the product object according to the inspection results, including: removing unqualified products and packing qualified products. Before performing impurity inspection, the product object may be placed in the inspection state to provide corresponding inspection conditions for subsequent detection, including: placing the product object in an inspection state of a target tilt angle as well as vibration and/or rotation.

In an example, for the transparent bottled liquid, by placing it in an inspection state of 45 degree tilt and vibration, the conventional bottle inversion may be replaced, avoiding a large number of air bubbles in the liquid in the bottle, reducing irrelevant variable factors introduced in the inspection process, and ensuring the accuracy of the subsequent impurity inspection.

In addition, it may also include, but is not limited to, an inspection state of 30 degree tilt and vibration, an inspection state of 40 degree tilt and vibration, an inspection state of 45 degree tilt, vibration and rotation, an inspection state of 45 degree tilt and rotation, an inspection state of 40 degree tilt and rotation, and so on, thus, by setting different inspection states such as tilt angles, vibration, and rotation, on the one hand, adaptive adjustments may be made for different product objects to improve the versatility of the impurity inspection in product objects, and on the other hand, by placing the product object in the corresponding inspection state, it may reduce the irrelevant variable factors introduced in the inspection process, and ensure the accuracy of the subsequent impurity inspection.

Step 102, performing video capture on the product object in the inspection state from a plurality of different preset capture angles to obtain captured videos of the product object at each of the preset capture angles.

When the product object in the inspection state is conveyed to the inspection apparatus, as the product object is conveyed on the conveyor apparatus, the image collection device located at a particular capture angle can record video of the product object as it passes by, so that when the product object passes through all of the image collection devices in its entirety, captured videos recorded by the image collection devices at different preset capture angles for the product object in the inspection state can be obtained. For example, the capture angles may be capture viewpoints set in advance in accordance with a certain angle difference, including a plurality of equidistant capture angles, such as ① 0°, 90°, 180°, 270°; ② 0°, 60°, 120°, 180°, 240°, 300°, etc. Thus, by using a plurality of different preset capture angles to capture images of the transparent bottled liquid being in a state of a target tilt angle and vibration and/or rotation, it may effectively enhance the image features, improve the precision of product inspection during the subsequent impurity inspection through image analysis, and then ensure the accuracy of detection results.

Figure 2:
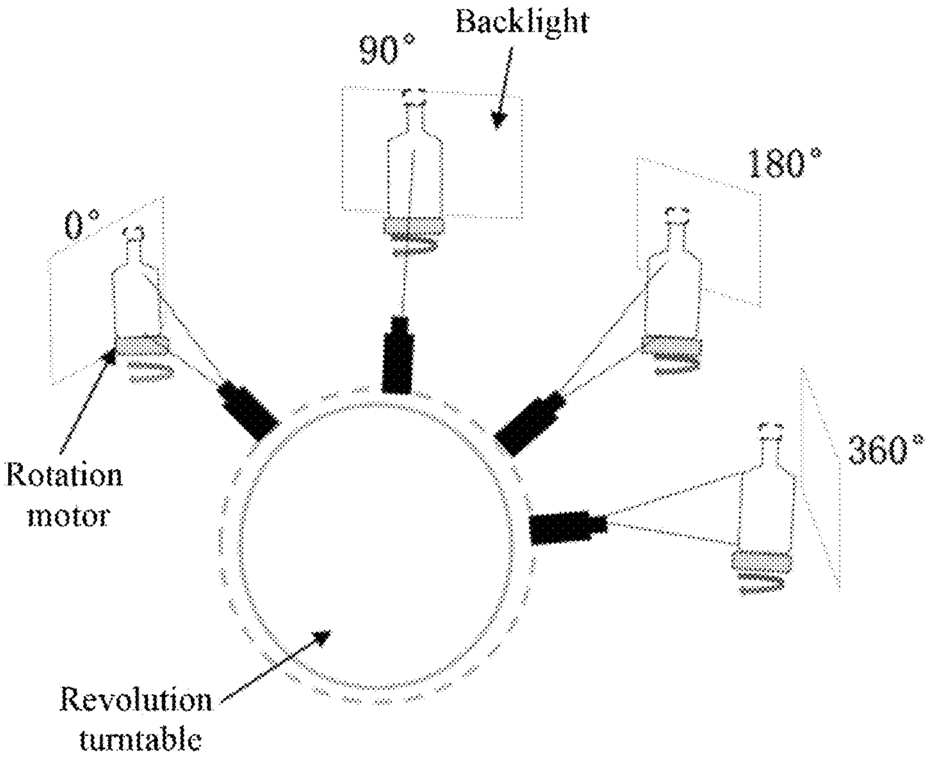
FIG. 2 is a schematic diagram of image collection provided in an embodiment of the present application.

In an example, referring to FIG. 2, FIG. 2 shows a schematic diagram of image collection provided in an embodiment of the present application, for the transparent bottled liquid, on the one hand, it may revolve in the revolution turntable of the system for impurity inspection, on the other hand, it may rotate through the corresponding product station. When it passes through the capture angles of 0°, 90°, 180°, 270°, etc., in the revolution process, the industrial cameras located in these capture angles may record the videos of the transparent bottled liquid to obtain the captured video 1, captured video 2, captured video 3, and captured video 4, etc. corresponding to the capture angles of 0°, 90°, 180°, 270°, etc., respectively, to perform subsequent impurity inspection on the transparent bottled liquid based on these captured videos. In an implementation, the transparent bottled liquid may be illuminated by a backlight corresponding to each capture angle during the video capture process to further enhance the image features.

Step 103: performing image processing on the captured video to obtain a captured image corresponding to the preset capture angle.

In an embodiment of the present application, after obtaining the captured video corresponding to each of the preset capture angles, the apparatus for impurity inspection may extract a target number of image frames from the captured video corresponding to the preset capture angles and perform image alignment on the image frames corresponding to each of the preset capture angles to obtain the captured images corresponding to each of the preset capture angles. For image alignment, by extracting product feature information corresponding to the product object in each of the image frames, and performing image correction on the image frames according to the product feature information corresponding to each of the image frames to obtain the captured images corresponding to each of the preset capture angles.

For the captured video corresponding to each capture angle, N image frames are extracted from each captured video, respectively, followed by obtaining product feature information corresponding to the product object from all the image frames by image recognition, and performing image alignment based on the product feature information, so as to remove irrelevant image features from the image frames by means of image alignment, and at the same time, making the areas included in each image frame are the same, so as to realize image correction. For example, 2 image frames are extracted from each of the captured video 1, the captured video 2, the captured video 3, and the captured video 4, and then image recognition is performed on the 8 image frames to identify the bottle features in the image that contain the transparent bottled liquid, and image alignment is performed based on the bottle features to remove the irrelevant features in the image, so that the areas included in each image are the same, and image correction is achieved. Thus, the images for impurity inspection are aligned by means of image alignment to ensure the consistency of the impurity inspection data and improve the precision of the subsequent image analysis.

Step 104: performing impurity inspection on the product object according to the captured images corresponding to each of the preset capture angles to generate an inspection result corresponding to the product object.

In an embodiment of the present application, after completing the image alignment, the apparatus for impurity inspection may combine the captured images corresponding to the preset capture angles to obtain a number of original image groups, construct a differential matrix corresponding to the original image group, perform image processing by using the differential matrix to generate a target image group corresponding to the original image group, and then perform impurity inspection on the product object by using each of the target image groups to generate the inspection result corresponding to the product object. Thus, the images are processed through combining images and constructing differential matrices, etc., which further enhances the image features of the product object, improves the precision of the product inspection, and ensures the accuracy of the inspection results, at the same time, based on the automation of the product inspection, the inspection efficiency may be effectively improved.

In an implementation, for the number of capture angles, which may be an even number, and all the captured images corresponding to the preset capture angles may be divided into 2 groups in order to obtain two groups of the original image groups, for example, the 4 captured images corresponding to 0° and 90° may be taken as an original image group A, and the 4 captured images corresponding to 180° and 270° may be taken as an original image group B, and then corresponding difference matrices may be constructed for each group of the original image groups, to obtain a differential matrix I corresponding to the original image group A, and a differential matrix II corresponding to the original image group B. Specifically, for the construction of the differential matrix, it may perform a pixel value subtraction between two adjacent captured images in the original image group to obtain several differential images corresponding to the original image group, and then it may construct the differential matrix corresponding to the original image group by taking each of the captured images as a matrix element in a first column and taking the differential images as matrix elements in other columns.

For example, the original image group A includes a captured image A1, a capture imaged A2, a captured image A3, and a captured image A4, then image subtraction may be perform on “capture imaged A1-captured image A2”, “captured image A2-capture imaged A3”, “capture image A3-captured image A4”, and “captured image A4-captured image A1” to obtain a differential image C1, a differential image C2, a differential image C3, and a differential image C4, and then each of the captured images in the original image group A may be taken as a matrix element in a first column of the differential matrix, and the differential images may be taken as matrix elements in other columns of the differential matrix, so as to construct the differential matrix I corresponding to the original image group A, the matrix elements in each row of the differential matrix I are different, and the following may be one of the composition manners of the differential matrix:

A1, C1, C2, C3, C4
A2, C2, C3, C4, C1
A3, C3, C4, C1, C2
A4, C4, C1, C2, C3

Based on the same process, one of the composition manners of the differential matrix II corresponding to the original image group B may be:

B1, D1, D2, D3, D4
B2, D2, D3, D4, D1
B3, D3, D4, D1, D2
B4, D4, D1, D2, D3

After obtaining the differential matrix corresponding to each of the original image groups through the above process, it may perform a preprocessing on the captured images through the differential method based on the differential matrixes to remove the background interference and extract the images containing the moving targets, specifically, except for the captured image in the first column of the differential matrix, differential processing is performed on other differential images in the same row through the differential method to obtain a first differential item and second differential item corresponding to each row of the differential matrix, feature stitching is performed by taking the captured image in the same row of the differential matrix as a R channel of an image, taking the first differential item as a G channel, and taking the second differential item as a B channel to generate an inspection image corresponding to the captured image of each row in the differential matrix. And then the inspection images are combined into the target image group corresponding to the original image group. Where the differential item may be the target image obtained according to the differential method: the R channel, the G channel, and the B channel may be color channels of the image, differential processing is performed on each row of the matrix elements in the differential matrix through the differential method, to obtain three target images including the first captured image, and then feature stitching is performed on these three images taken as three color channels in accordance with the corresponding channel order, to obtain the inspection image corresponding to each row of the captured image, thus, through image feature stitching, it enhances the image features of the product object, improves the precision of the product inspection, ensures the accuracy of the inspection results, at the same time, based on the automation of the product inspection, the inspection efficiency may be effectively improved.

In an example, for row i in the differential matrix, $a_{i0}$ may be used as the original image $T_0$, $[(a_{i1}+a_{i2})/2-a_{i0}]$ is used as the differential item $T_1$, and $[(a_{i3}+a_{i4})/2-a_{i0}]$ is used as the differential item $T_2$, and then $T_0$ may be used as the R channel of the new image, $T_1$ may be used as the G channel of the new image, and $T_2$ may be used as the B channel of the new image, to construct the inspection image i' corresponding to the i-th captured image, and then all of the inspection images may be combined to obtain the new image group, thus, through image feature stitching, it enhances the image features of the product object, improves the precision of the product inspection, ensures the accuracy of the inspection results, at the same time, based on the automation of the product inspection, the inspection efficiency may be effectively improved.

After obtaining the target image groups through the above process, it may perform impurity inspection by inputting each of the target image groups into an impurity inspection model, to obtain inspection information corresponding to the target image group, if each piece of the inspection information characterizes that the product object does not contain an impurity, it generates product conformity information for the product object: and if at least one piece of inspection information characterizes that the product object contains an impurity, it obtains impurity category information and impurity probability information corresponding to the impurity, and adopts the impurity category information and the impurity probability information to generate product re-inspection information corresponding to the product object.

In an implementation, for the impurity in the product object, it may include an impurity associated with the quality of the raw material, and may also include an impurity associated with the processing technology, different categories of impurities may be processed in different ways, for example, for the transparent bottled liquid, if the impurity is within the liquid, it can be directly determined that the transparent bottled liquid is a substandard product: and if the impurity is an impurity of the bottle, the transparent bottled liquid may be used as a re-inspection product for manual re-inspection or second machine inspection, etc., so as to ensure the accuracy of the inspection and the quality of the product.

Specifically, the impurity category information may be used to characterize which category of impurity that the inspected impurity belongs to, such as a liquid impurity, a bottle body impurity, a packaging impurity, etc. The impurity probability information may be the probability of the impurity appearing in the image, higher probability characterizes that the impurities are more obvious and abundant, etc. The impurity inspection model may perform image recognition on each of the inspection images in each group of the target image group to identify whether the image contains impurities, and in the case that the impurity is inspected, to obtains the category of the impurity and the probability of the appearance of the impurity, and then outputs the corresponding inspection result, so that the inspection system may process the product object according to the inspection result, and realize the impurity inspection of the product object.

Figure 3:
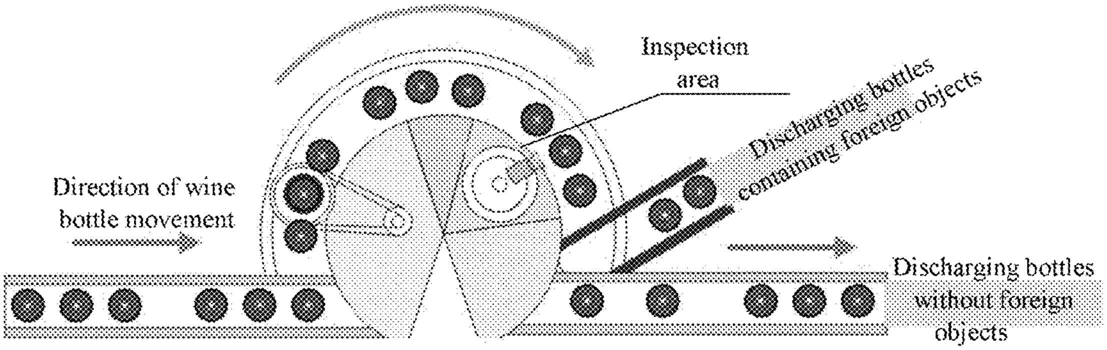
FIG. 3 is a processing schematic diagram of a system for impurity inspection provided in an embodiment of the present application.

In an example, referring to FIG. 3, FIG. 3 shows a processing schematic diagram of a system for impurity inspection provided in an embodiment of the present application. Taking a wine bottle fitted with transparent liquid as an example for exemplary illustration, the system for impurity inspection may include a feed area, a turntable area, and an outfeed area, and structural components included in the relevant areas can refer to the above description and will not be repeated here. Where the feed area may place the wine bottle at a 45 degree tilt with vibration, so as to shoot the impurity at the bottle body and the bottom of the bottle body: the wine bottles conveyed in the turntable area are equidistant, and the wine bottles are rotated by rotation and revolution, while multiple cameras are deployed in the inspection area of the turntable area to capture images of the wine bottles from different angles, such as 0°, 90°, 180°, 270°, etc. In the outfeed area, a removing apparatus is installed, which may inspect and analyze impurities according to the captured image, and discharge bottles containing foreign objects, as well as bottles without foreign objects, thus, in the impurity inspection process of the bottled liquid, it performs impurity inspection through placing the bottle body in a state 45 degree with vibration, which may reduce the irrelevant variable factors in the inspection process of the liquid, ensure the stability of the inspection results, and at the same time, by performing image collection on the liquid from a plurality of different preset capture angles, it may effectively enhance the image features, improve the precision of the product inspection, and ensure the accuracy of the inspection results, at the same time, based on the automation of the product inspection, the inspection efficiency may be effectively improved.

It should be noted that embodiments of the present application include but are not limited to the above examples, and it can be understood that under the ideological guidance of embodiments of the present application, those skilled in the art can also make settings according to actual needs, which is not limited by the present application.

Embodiments of the present application can be applied to automated inspection of the product object, by determining a product object to be inspected and placing the product object in an inspection state, performing video capture on the product object in the inspection state from a plurality of different preset capture angles to obtain captured videos of the product object at each of the preset capture angles, performing image processing on the captured video to obtain captured images corresponding to each of the preset capture angles, and performing impurity inspection on the product object according to the captured images corresponding to each of the preset capture angles to generate a corresponding inspection result, thus, in the impurity inspection process, by performing impurity inspection through placing the product object in an inspection state, it may reduce the irrelevant variable factors in the inspection process of the product object, and ensure the stability of the inspection results; and by performing image collection on the product object from a plurality of different preset capture angles, it may effectively enhance the image features, improve the precision of the product inspection, and ensure the accuracy of the inspection results; moreover, based on the automation of the product inspection, the inspection efficiency may be effectively improved.

It should be noted that, for method embodiments, they are all expressed as a series of action combinations for the sake of simplicity of description, however, those skilled in the art should be aware that embodiments of the present application are not limited by the order of the described actions, as according to embodiments of the present application, certain steps can be performed in other sequences or simultaneously. Secondly, the person skilled in the art should also be aware that the embodiments described in the specification are preferred embodiments and the actions involved are not necessarily necessary for the embodiments of the present application.

Figure 4:
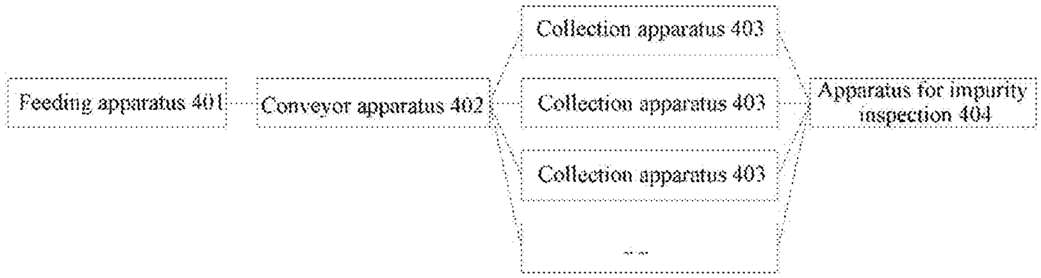
FIG. 4 is a structural block diagram of a system for impurity inspection in a product provided in an embodiment of the present application.

Referring to FIG. 4, FIG. 4 shows a structural block diagram of a system for impurity inspection in a product provided in an embodiment of the present application, which may specifically include an infeed apparatus 401, a conveyor apparatus 402, a number of collection apparatuses 403 corresponding to different preset capture angles, and an apparatus for impurity inspection 404; where, the infeed apparatus 401 is configured to convey a product object to be inspected and place the product object in an inspection state;

the collection apparatuses 403 are configured to perform video capture on the product object in the inspection state during a process of conveying the product object by the conveyor apparatus 402, to obtain captured videos of the product object at each of the preset capture angles; and the apparatus for impurity inspection 404 is configured to perform image processing on the captured video to obtain a captured image corresponding to the preset capture angle, and perform impurity inspection on the product object according to the captured images corresponding to each of the preset capture angles to generate an inspection result corresponding to the product object.

In an embodiment, the infeed apparatus 401 includes at least a front conveyor belt, a corner clamp belt, and a lamp inspection clamp belt; where, the corner clamp is configured to place the product object to be inspected conveyed by the front conveyor belt at a target tilt angle;

the lamp inspection clamp belt is configured to perform vibration processing on the product object; and the front conveyor belt is configured to convey the product object in a state of a target tilt angle, and vibration and/or rotation to the conveyor apparatus 402.

In an embodiment, the infeed apparatus 402 includes an infeed turnplate, a conveyor turnplate, and a outfeed turnplate, and the conveyor turnplate includes multiple product stations; where, the infeed turnplate is configured to convey the product object conveyed by the front conveyor belt to the product station;

the product station is configured to place the product object in a self-rotating state; and the outfeed turnplate is configured to convey the inspected product object out of the conveyor turnplate.

In an embodiment, the collection apparatus 403 includes a number of image collection devices set according to a preset angle difference;

the image collection device is configured to perform video capture on the product object in the inspection state according to the preset capture angle during a process of conveying the product object, to obtain a captured image corresponding to the preset capture angle.

In an embodiment, the apparatus for impurity inspection 404 includes at least a captured image extraction module, an image inspection module; where, the captured image extraction module is configured to extract a target number of image frames from the captured video corresponding to the preset capture angle, extract product feature information corresponding to the product object in each of the image frames, and perform correction on the image frames according to the product feature information corresponding to each of the image frames to obtain the captured images corresponding to each of the preset capture angles; and the image inspection module is configured to combine the captured images corresponding to two adjacent preset capture angles to obtain a number of original image groups, and construct a differential matrix corresponding to the original image group, then perform image processing by using the differential matrix to generate a target image group corresponding to the original image group, and perform impurity inspection on the product object by using each of the target image groups to generate the inspection result corresponding to the product object.

In an embodiment, the image inspection module includes a differential matrix module, an image group module, and an inspection module; where, the differential matrix module is configured to perform a pixel value subtraction between two adjacent captured images in the original image group to obtain a number of differential images corresponding to the original image group, and construct the differential matrix corresponding to the original image group by taking each of the captured images as a matrix element in a first column and taking the differential images as matrix elements in other columns;

the image group module is configured to perform differential processing on other differential images in the same row, except for the captured image in the first column of the differential matrix, to obtain a first differential item and a second differential item corresponding to each row of the differential matrix, perform feature stitching by taking the captured image in the same row of the differential matrix as a R channel of an image, take the first differential item as a G channel, and take the second differential item as a B channel, to generate an inspection image corresponding to the captured image of each row in the differential matrix, and combine each of the inspection images into the target image group corresponding to the original image group; and the inspection module is configured to perform impurity inspection by inputting each of the target image groups into an impurity inspection model to obtain inspection information corresponding to the target image group, if each piece of the inspection information characterizes that the product object does not contain an impurity, generate product conformity information for the product object; and if at least one piece of inspection information characterizes that the product object contains an impurity, obtain impurity category information and impurity probability information corresponding to the impurity, and adopt the impurity category information and the impurity probability information to generate product re-inspection information corresponding to the product object.

In an example, the infeed apparatus may include a pushing material clamp belt, a corner clamp belt, a lamp inspection clamp belt, a rotation apparatus, a distributing material screw apparatus, an infeed turnplate, etc.; the conveyor apparatus may include a front conveyor belt, an infeed turnplate, a conveyor turnplate, and an outfeed turnplate, etc.; the collection apparatus may include a number of image collection devices corresponding to different capture viewpoints; and the removing apparatus may include a removing receiving-material conveyor belt, a removing component, etc. In the actual inspection process, the product object may be sent into the lamp inspection clamp belt through the pushing material clamp belt and the corner clamp belt in accordance with the specified angle, and adding vibration, so as to achieve placing the product object in the inspection state; and then, the product object in the inspection state enters the product station of the conveyor turnplate at an equal interval for revolution through the rotation apparatus, the distributing material screw apparatus, the infeed turnplate, etc. Where each product station is equipped with a motor that can achieve rotation while the product object revolves, at this time, foreign objects within the product object are suspended by rotation and revolution, which is easy to perform image collection. Image collection devices are installed at specific product stations on the conveyor turnplate, e.g. 0°, 90°, 180° and 270°, to perform image collection on the product object. When the product object has been inspected, it can be sent out from the conveyor turnplate by passing through the outfeed turnplate, and the unqualified product object may be removed through the removing component at the exit, so as to realize the removing of the defective product, thereby realizing the automated inspection process of the product object.

It should be noted that for the impurity inspection in the product object by means of image recognition, reference can be made to the relevant process of the previous embodiment, which will not be repeated herein.

In an embodiment of the present application, the system for impurity inspection may include an infeed apparatus, a conveyor apparatus, a number of collection apparatuses corresponding to different preset capture angles, an apparatus for impurity inspection, etc., in the automatic inspection process of the product object, the infeed apparatus may convey a product object to be inspected and place the product object in an inspection state, the collection apparatus may perform video capture on the product object in the inspection state during the process of conveying the product object by the conveyor apparatus, to obtain captured videos of the product object at each of the preset capture angles, and then the apparatus for impurity inspection may perform image processing on the captured videos to obtain a captured image corresponding to the preset capture angle, and perform impurity inspection on the product object according to the captured images corresponding to each of the preset capture angles, to generate an inspection result corresponding to the product object, thus, in the impurity inspection process, by performing impurity inspection through placing the product object in an inspection state, it may reduce the irrelevant variable factors in the inspection process of the product object, and ensure the stability of the inspection results; and by performing image collection on the product object from a plurality of different preset capture angles, it may effectively enhance the image features, improve the precision of the product inspection, and ensure the accuracy of the inspection results; moreover, based on the automation of the product inspection, the inspection efficiency may be effectively improved.

Figure 5:
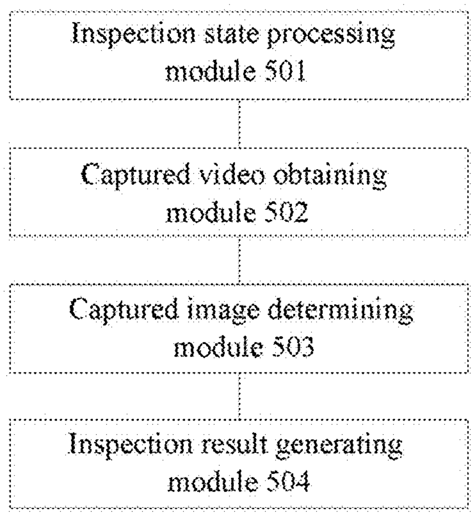
FIG. 5 is a structural block diagram of an apparatus for impurity inspection in a product provided in an embodiment of the present application.

Referring to FIG. 5, FIG. 5 shows a structural block diagram of an apparatus for impurity inspection in a product provided in an embodiment of the present application, which specifically may include the following modules:

an inspection state processing module 501, configured to determine a product object to be inspected and placing the product object in an inspection state;

a captured video obtaining module 502, configured to perform video capture on the product object in the inspection state from a plurality of different preset capture angles to obtain captured videos of the product object at each of the preset capture angles;

a captured image determining module 503, configured to perform image processing on the captured video to obtain a captured image corresponding to the preset capture angle; and an inspection result generating module 504, configured to perform impurity inspection on the product object according to the captured images corresponding to each of the preset capture angles to generate an inspection result corresponding to the product object.

In an embodiment, the inspection state processing module 501 is specifically configured to:

place the product object in an inspection state of a target tilt angle as well as vibration and/or rotation.

In an embodiment, the captured image determining module 503 includes:

an image frame extraction submodule, configured to extract a target number of image frames from the captured video corresponding to the preset capture angle; and a captured image obtaining submodule, configured to perform image alignment on the image frames corresponding to each of the preset capture angles to obtain the captured images corresponding to each of the preset capture angles.

In an embodiment, the captured image obtaining submodule is specifically configured to:

extract product feature information corresponding to the product object in each of the image frames; and perform image correction on the image frames according to the product feature information corresponding to each of the image frames to obtain the captured images corresponding to each of the preset capture angles.

In an embodiment, the inspection result generating module 504 includes:

a differential matrix constructing submodule, configured to combine the captured images corresponding to the preset capture angles to obtain a number of original image groups, and constructing a differential matrix corresponding to the original image group;

an image group generating submodule, configured to perform image processing by using the differential matrix to generate a target image group corresponding to the original image group; and an inspection result generating submodule, configured to perform impurity inspection on the product object by using each of the target image groups to generate the inspection result corresponding to the product object.

In an embodiment, the differential matrix constructing submodule is specifically configured to:

perform a pixel value subtraction between two adjacent captured images in the original image group to obtain a number of differential images corresponding to the original image group; and construct the differential matrix corresponding to the original image group by taking each of the captured images as a matrix element in a first column and taking the differential images as matrix elements in other columns.

In an embodiment, the image group generating submodule is specifically configured to:

perform differential processing on other differential images in the same row, except for the captured image in the first column of the differential matrix, to obtain a first differential item and a second differential item corresponding to each row of the differential matrix;

perform feature stitching by taking the captured image in the same row of the differential matrix as a R channel of an image, take the first differential item as a G channel, and take the second differential item as a B channel, to generate an inspection image corresponding to the captured image of each row in the differential matrix; and combine each of the inspection images into the target image group corresponding to the original image group.

In an embodiment, the inspection result generating submodule is specifically configured to:

perform impurity inspection by inputting each of the target image groups into an impurity inspection model to obtain inspection information corresponding to the target image group;

if each piece of the inspection information characterizes that the product object does not contain an impurity, generate product conformity information for the product object; and if at least one piece of inspection information characterizes that the product object contains an impurity, obtain impurity category information and impurity probability information corresponding to the impurity, and adopt the impurity category information and the impurity probability information to generate product re-inspection information corresponding to the product object.

For the apparatus embodiments, since they are substantially similar to the method embodiments, the description is relatively simple, and it is sufficient to refer to part of the description of the method embodiments where relevant.

Figure 6:
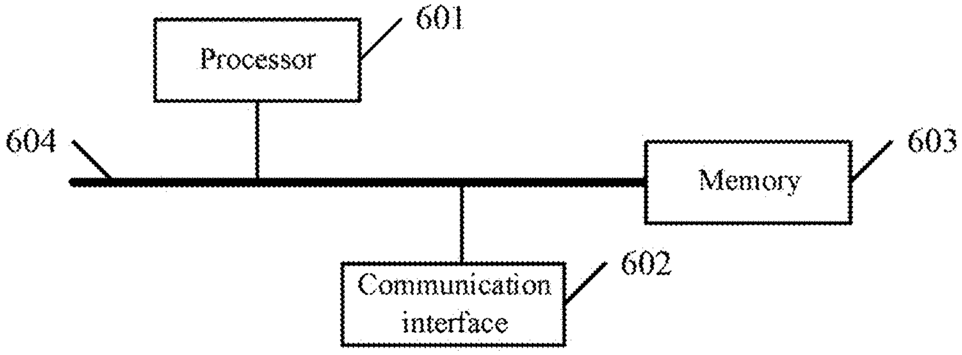
FIG. 6 is a block diagram of an electronic device provided in an embodiment of the present application.

In addition, an embodiment of the present application also provides an electronic device, as shown in FIG. 6, including: a processor 601, a communication interface 602, a memory 603, and a communication bus 604, where the processor 601, the communication interface 602, and the memory 603 communicate with each other through the communication bus 604;

the memory 603 is configured to store a computer program; and the processor 601 is configured to execute the program stored in the memory 603 to implement the following steps:

determining a product object to be inspected and placing the product object in an inspection state;

performing video capture on the product object in the inspection state from a plurality of different preset capture angles to obtain captured videos of the product object at each of the preset capture angles;

performing image processing on the captured video to obtain a captured image corresponding to the preset capture angle; and performing impurity inspection on the product object according to the captured images corresponding to each of the preset capture angles to generate an inspection result corresponding to the product object.

In an embodiment, the placing the product object in the inspection state includes:

placing the product object in an inspection state of a target tilt angle as well as vibration and/or rotation.

In an embodiment, the performing the image processing on the captured video to obtain the captured image corresponding to the preset capture angle includes:

extracting a target number of image frames from the captured video corresponding to the preset capture angle; and performing image alignment on the image frames corresponding to each of the preset capture angles to obtain the captured images corresponding to each of the preset capture angles.

In an embodiment, the performing the image alignment on the image frames corresponding to each of the preset capture angles to obtain the captured images corresponding to each of the preset capture angles includes:

extracting product feature information corresponding to the product object in each of the image frames; and performing image correction on the image frames according to the product feature information corresponding to each of the image frames to obtain the captured images corresponding to each of the preset capture angles.

In an embodiment, the performing the impurity inspection on the product object according to the captured images corresponding to each of the preset capture angles to generate the inspection result corresponding to the product object includes:

combining the captured images corresponding to the preset capture angles to obtain a number of original image groups, and constructing a differential matrix corresponding to the original image group;

performing image processing by using the differential matrix to generate a target image group corresponding to the original image group; and performing impurity inspection on the product object by using each of the target image groups to generate the inspection result corresponding to the product object.

In an embodiment, the constructing the differential matrix corresponding to the original image group includes:

performing a pixel value subtraction between two adjacent captured images in the original image group to obtain a number of differential images corresponding to the original image group; and constructing the differential matrix corresponding to the original image group by taking each of the captured images as a matrix element in a first column and taking the differential images as matrix elements in other columns.

In an embodiment, the performing the image processing by using the differential matrix to generate the target image group corresponding to the original image group includes:

performing differential processing on other differential images in the same row, except for the captured image in the first column of the differential matrix, to obtain a first differential item and a second differential item corresponding to each row of the differential matrix;

performing feature stitching by taking the captured image in the same row of the differential matrix as a R channel of an image, taking the first differential item as a G channel, and taking the second differential item as a B channel, to generate an inspection image corresponding to the captured image of each row in the differential matrix; and combining each of the inspection images into the target image group corresponding to the original image group.

In an embodiment, the performing the impurity inspection on the product object by using each of the target image groups to generate the inspection result corresponding to the product object includes:

performing impurity inspection by inputting each of the target image groups into an impurity inspection model to obtain inspection information corresponding to the target image group;

if each piece of the inspection information characterizes that the product object does not contain an impurity, generating product conformity information for the product object; and if at least one piece of inspection information characterizes that the product object contains an impurity, obtaining impurity category information and impurity probability information corresponding to the impurity, and adopting the impurity category information and the impurity probability information to generate product re-inspection information corresponding to the product object.

The communication bus of the above device may be a peripheral component interconnect (PCI) bus or an extended industry standard architecture (EISA) bus or the like. This communication bus can be divided into an address bus, a data bus, a control bus, etc. For ease of representation, only one thick line is represented in the diagram, but which does not indicate that there is only one bus or one type of buses.

The communication interface is used for communication between the above terminal and other devices.

The memory may include a random access memory (RAM) or may include a non-volatile memory, such as at least one magnetic disk memory. In an implementation, the memory may also be at least one storage apparatus located away from the aforementioned processor.

The above processor may be a general-purpose processor, including a processor (Central Processing Unit, CPU), a network processor (NP), etc.; may also be a digital signal processor (DSP), an application specific integrated circuit (ASIC), a field-programmable gate array (FPGA) or other programmable logic means, discrete gate or transistor logic means, discrete hardware components.

Figure 7:
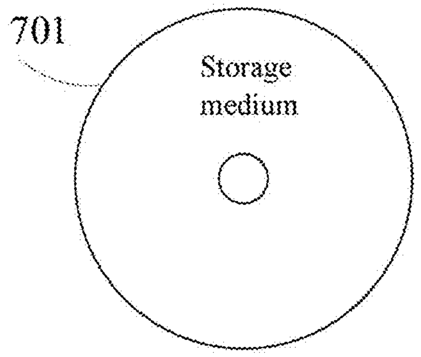
FIG. 7 is a schematic diagram of a computer readable storage medium provided in an embodiment of the present application.

As shown in FIG. 7, in another embodiment provided by the present application, a computer readable storage medium 701 is also provided, the computer readable storage medium stores instructions which, when running on a computer, enable the computer to perform the method for impurity inspection in a product described in the above embodiment.

In yet another embodiment provided by the present application, a computer program product including instructions is also provided, where when the instructions run on a computer, the computer is enabled to perform the method for impurity inspection in a product described in the above embodiment.

In yet still another embodiment provided by the present application, a software product including a computer program/instructions is also provided, where when the computer program/the instructions are executed, the method for impurity inspection in a product described in the above embodiment is implemented.

In the above embodiments, it can be fully or partially implemented through software, hardware, firmware, or any combination thereof. When implemented using software, it may be fully or partially implemented in the form of a computer program product. The computer program product includes one or more computer instructions. When loading and executing the computer program instructions in the computer, all or part of the processes or functions according to embodiments of the present application are generated. The computer may be a general-purpose computer, a special-purpose computer, a computer network, or other programmable apparatuses. The computer instructions may be stored in a computer readable storage medium or transmitted from one computer readable storage medium to another computer readable storage medium, e.g., the computer instructions may be transmitted from one website, computer, server or data center to another via wired (e.g. coaxial cable, optical fiber, digital subscriber line (DSL)) or wireless (e.g. infrared, wireless, microwave, etc.) methods. The computer readable storage medium may be any usable medium that a computer can access, or a data storage device such as a server, a data center, etc., integrated by containing one or more usable media. The usable medium may be a magnetic medium, (e.g., a floppy disc, a hard disc, a tape), an optical medium (e.g., a DVD), or a semiconductor medium (e.g., a solid state disk (SSD)), and the like.

It should be noted that, in the present application, the relation terms such as first and second are only used to distinguish one entity or operation from another entity or operation, and do not necessarily require or imply any actual relationship or order exists between these entities or operations. Moreover, the terms "include", "comprise", or any other variation thereof are intended to encompass non-exclusive inclusion, such that a process, a method, an item, or a device that includes a series of elements not only includes those elements, but also includes other elements that are not explicitly listed, or also includes elements inherent to such process, method, item, or device. Without further limitation, an element defined by the phrase "including a . . . " does not exclude the existence of other identical elements in the process, the method, the item or the device including the element.

Various embodiments in this specification are described in relevant ways, and the same and similar parts between each embodiment can be referred to each other, each embodiment focuses on the differences from other embodiments. In particular, for the system embodiments, since they are substantially similar to the method embodiments, the description is relatively simple, and it is sufficient to refer to the partial description of the method embodiments where relevant.

The foregoing is only a preferred embodiment of the present application and is not intended to limit the protection scope of the present application. Any modifications, equivalent replacements, improvements, etc. made within the spirit and principle of the present application shall be included within the protection scope of the present application.

The invention claimed is:

1. A method for impurity inspection in a product, comprising:

determining a product object to be inspected and placing the product object in an inspection state;

performing video capture on the product object in the inspection state from a plurality of different preset capture angles to obtain captured videos of the product object at each of the preset capture angles;

performing image processing on the captured video to obtain a captured image corresponding to the preset capture angle; and performing impurity inspection on the product object according to the captured images corresponding to each of the preset capture angles to generate an inspection result corresponding to the product object, wherein the performing the impurity inspection on the product object according to the captured images corresponding to each of the preset capture angles to generate the inspection result corresponding to the product object comprises:

combining the captured images corresponding to the preset capture angles to obtain a number of original image groups, and constructing a differential matrix corresponding to the original image group;

performing image processing by using the differential matrix to generate a target image group corresponding to the original image group; and performing impurity inspection on the product object by using each of the target image groups to generate the inspection result corresponding to the product object.

2. The method according to claim 1, wherein the placing the product object in the inspection state comprises:

placing the product object in an inspection state of a target tilt angle as well as vibration and/or rotation.

3. The method according to claim 1, wherein the performing the image processing on the captured video to obtain the captured image corresponding to the preset capture angle comprises:

extracting a target number of image frames from the captured video corresponding to the preset capture angle; and performing image alignment on the image frames corresponding to each of the preset capture angles to obtain the captured images corresponding to each of the preset capture angles.

4. The method according to claim 3, wherein the performing the image alignment on the image frames corresponding to each of the preset capture angles to obtain the captured images corresponding to each of the preset capture angles comprises:

extracting product feature information corresponding to the product object in each of the image frames; and performing image correction on the image frames according to the product feature information corresponding to each of the image frames to obtain the captured images corresponding to each of the preset capture angles.

5. The method according to claim 1, wherein the constructing the differential matrix corresponding to the original image group comprises:

performing a pixel value subtraction between two adjacent captured images in the original image group to obtain a number of differential images corresponding to the original image group; and constructing the differential matrix corresponding to the original image group by taking each of the captured images as a matrix element in a first column and taking the differential images as matrix elements in other columns.

6. The method according to claim 5, wherein the performing the image processing by using the differential matrix to generate the target image group corresponding to the original image group comprises:

performing differential processing on other differential images in the same row, except for the captured image in the first column of the differential matrix, to obtain a first differential item and a second differential item corresponding to each row of the differential matrix;

performing feature stitching by taking the captured image in the same row of the differential matrix as a R channel of an image, taking the first differential item as a G channel, and taking the second differential item as a B channel, to generate an inspection image corresponding to the captured image of each row in the differential matrix; and combining each of the inspection images into the target image group corresponding to the original image group.

7. The method according to claim 1, wherein the performing the impurity inspection on the product object by using each of the target image groups to generate the inspection result corresponding to the product object comprises:

performing impurity inspection by inputting each of the target image groups into an impurity inspection model to obtain inspection information corresponding to the target image group;

based on that each piece of the inspection information characterizes that the product object does not contain an impurity, generating product conformity information for the product object; and based on that at least one piece of inspection information characterizes that the product object contains an impurity, obtaining impurity category information and impurity probability information corresponding to the impurity, and adopting the impurity category information and the impurity probability information to generate product re-inspection information corresponding to the product object.

8. A system for impurity inspection in a product, comprising: an infeed apparatus, a conveyor apparatus, a number of collection apparatuses corresponding to different preset capture angles, and an apparatus for impurity inspection; wherein, the infeed apparatus is configured to convey a product object to be inspected and place the product object in an inspection state; and the collection apparatuses are configured to perform video capture on the product object in the inspection state during a process of conveying the product object by the conveyor apparatus, to obtain captured videos of the product object at each of the preset capture angles;

the apparatus for impurity inspection is configured to perform image processing on the captured video to obtain a captured image corresponding to the preset capture angle, and perform impurity inspection on the product object according to the captured images corresponding to each of the preset capture angles to generate an inspection result corresponding to the product object, wherein to perform the impurity inspection on the product object according to the captured images corresponding to each of the preset capture angles to generate the inspection result corresponding to the product object, the apparatus for impurity inspection is configured to:

combine the captured images corresponding to the preset capture angles to obtain a number of original image groups, and constructing a differential matrix corresponding to the original image group;

perform image processing by using the differential matrix to generate a target image group corresponding to the original image group; and perform impurity inspection on the product object by using each of the target image groups to generate the inspection result corresponding to the product object.

9. The system according to claim 8, wherein the infeed apparatus comprises at least a front conveyor belt, a corner clamp belt, and a lamp inspection clamp belt;

the corner clamp is configured to place the product object to be inspected conveyed by the front conveyor belt at a 45 degree tilt;

the lamp inspection clamp belt is configured to perform vibration processing on the product object;

the front conveyor belt is configured to convey the product object in a state of 45 degree tilt and vibration to the conveyor apparatus.

10. The system according to claim 8, wherein the collection apparatus comprises a number of image collection devices set according to a preset angle difference;

the image collection device is configured to perform video capture on the product object in the inspection state according to the preset capture angle during a process of conveying the product object, to obtain a captured image corresponding to the preset capture angle.

11. An apparatus for impurity inspection in a product, comprising:

a processor, a communication interface, a memory, and a communication bus, wherein the processor, the communication interface, and the memory communicate with each other through the communication bus;

the memory is configured to store a computer program;

the computer program, when executed by the processor, causes the processor to:

determine a product object to be inspected and placing the product object in an inspection state;

perform video capture on the product object in the inspection state from a plurality of different preset capture angles to obtain captured videos of the product object at each of the preset capture angles;

perform image processing on the captured video to obtain a captured image corresponding to the preset capture angle; and perform impurity inspection on the product object according to the captured images corresponding to each of the preset capture angles to generate an inspection result corresponding to the product object, wherein to perform the impurity inspection on the product object according to the captured images corresponding to each of the preset capture angles to generate the inspection result corresponding to the product object, the computer program, when executed by the processor, causes the processor to:

combine the captured images corresponding to the preset capture angles to obtain a number of original image groups, and constructing a differential matrix corresponding to the original image group;

perform image processing by using the differential matrix to generate a target image group corresponding to the original image group; and perform impurity inspection on the product object by using each of the target image groups to generate the inspection result corresponding to the product object.

12. The apparatus according to claim 11, wherein the processor is further caused to:

place the product object in an inspection state of a target tilt angle as well as vibration and/or rotation.

13. The apparatus according to claim 11, wherein the processor is further caused to:

extract a target number of image frames from the captured video corresponding to the preset capture angle; and perform image alignment on the image frames corresponding to each of the preset capture angles to obtain the captured images corresponding to each of the preset capture angles.

14. The apparatus according to claim 13, wherein the processor is further caused to:

extract product feature information corresponding to the product object in each of the image frames; and perform image correction on the image frames according to the product feature information corresponding to each of the image frames to obtain the captured images corresponding to each of the preset capture angles.

15. The apparatus according to claim 11, wherein the processor is further caused to:

perform a pixel value subtraction between two adjacent captured images in the original image group to obtain a number of differential images corresponding to the original image group; and construct the differential matrix corresponding to the original image group by taking each of the captured images as a matrix element in a first column and take the differential images as matrix elements in other columns.

16. The apparatus according to claim 15, wherein the processor is further caused to:

perform differential processing on other differential images in the same row, except for the captured image in the first column of the differential matrix, to obtain a first differential item and a second differential item corresponding to each row of the differential matrix;

perform feature stitching by taking the captured image in the same row of the differential matrix as a R channel of an image, take the first differential item as a G channel, and taking the second differential item as a B channel, to generate an inspection image corresponding to the captured image of each row in the differential matrix; and combine each of the inspection images into the target image group corresponding to the original image group.

17. The apparatus according to claim 11, wherein the processor is further caused to:

perform impurity inspection by inputting each of the target image groups into an impurity inspection model to obtain inspection information corresponding to the target image group;

based on that each piece of the inspection information characterizes that the product object does not contain an impurity, generate product conformity information for the product object; and based on that at least one piece of inspection information characterizes that the product object contains an impurity, obtain impurity category information and impurity probability information corresponding to the impurity, and adopt the impurity category information and the impurity probability information to generate product re-inspection information corresponding to the product object.

* * * * *